United States Patent Office 2,985,648
Patented May 23, 1961

2,985,648

ALPHA-AMINOBENZYLPENICILLINS

Frank Peter Doyle, 42 Hillside Gardens, Betchworth, England; John Herbert Charles Nayler, Coombelea, Cliftonville; and Harry Smith, Rockhouse, South Drive, Deepdene, both of Dorking, England No Drawing. Filed Feb. 2, 1961, Ser. No. 81,630
Claims priority, application Great Britain Oct. 6, 1958

5 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive and Gram-negative bacteria and, more particularly, relates to α-aminobenzylpenicillins and nontoxic salts thereof.

This application is a continuation-in-part of our prior co-pending applications Serial No. 844,162, filed October 5, 1959, and Serial No. 71,910, filed November 28, 1960 both now abandoned.

Antibacterial agents such as benzylpenicillin have proved highly effective in the past in the therapy of infections due to Gram-positive bacteria but such agents suffer from the serious drawbacks of being unstable in aqueous acid, e.g., upon oral administration, and of being ineffective against numerous strains of bacteria, e.g., most Gram-negative bacteria. The compounds of the present invention are particularly useful in that they possess potent antibacterial activity against both Gram-positive and Gram-negative bacteria upon either parenteral or oral administration and also exhibit resistance to destruction by acid.

There is provided, according to the present invention, a member selected from the group consisting of an acid having the formula

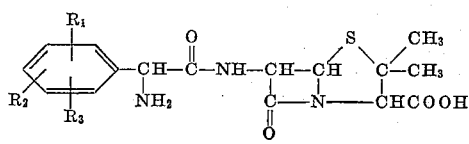

wherein $R_1$, $R_2$ and $R_3$ each represent a member selected from the group consisting of hydrogen, nitro, di(lower) alkylamino, (lower)alkanoylamino, (lower)alkanoyloxy, (lower)alkyl (including straight and branched chain saturated aliphatic groups having from 1 to 6 carbon atoms inclusive), (lower)alkoxy, sulfamyl, chloro, iodo, bromo, fluoro and trifluoromethyl; and the nontoxic carboxylic acid salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N - benzyl-beta-phenethylamine, 1-ephenamine, N,N′-dibenzylethylenediamine, dehydroabietylamine, N,N′-bis - dehydroabietylethylenediamine, N-(lower)alkylpiperidine, e.g., N-ethylpiperidine and other amines which have been used to form salts with benzylpenicillin; and the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like. The α-carbon atom of the acyl group (to which the α-amino group is attached) is an asymmetric carbon atom and the compounds of this invention can therefore exist in two optically active isomeric forms [the D-(—) and L-(+) diastereoisomers], as well as in the optically inactive DL form which is a mixture of the two optically active forms; all such isomeric forms of the compounds are included within the scope of the present invention. Also included within the scope of the present invention are easily hydrolyzed esters which are converted to the free acid form by chemical or enzymatic hydrolysis.

It should be noted in connection with the foregoing consideration of the diastereoisomers of this invention that many isomers other than the two caused by the asymmetric carbon of the side chain are possible due to the presence of asymmetric carbon atoms in the 6-aminopenicillanic acid nucleus. Such additional isomers, however, are not presently significant since 6-aminopenicillanic acid which is the product of fermentation processes is consistently of one configuration; such 6-aminopenicillanic acid is presently used in the production of the compounds of this invention.

The products of the present invention are prepared by reaction of 6-aminopenicillanic acid, preferably in the form of a neutral salt such as the sodium salt or the triethylamine salt, with an acid chloride having the formula

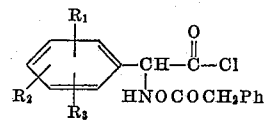

wherein $R_1$, $R_2$ and $R_3$ have the meanings given above, or its functional equivalent as an acylating agent for a primary amino group and thereafter removing the protecting group from the amino radical by hydrogenation under sufficiently mild conditions to avoid destruction of the penicillin nucleus. The protecting group, PhCH$_2$OCO— in the formula above may, of course, be replaced by another functionally equivalent protecting group as set forth below. The functional equivalents of the acid chloride set forth above include the corresponding carboxylic acid bromides, acid anhydrides and mixed anhydrides with other carboxylic acids, including monoesters, and particularly lower aliphatic esters, of carbonic acid.

The protected amino acid is preferably prepared by the method described in Example 1 below, which method is also discussed in "A Textbook of Biochemistry" by P. H. Mitchell, at page 113. In the next step, the 6-aminopenicillanic acid may be reacted with a mixed anhydride prepared by reacting the amino-substituted carboxylic acid, or a salt thereof, having its groups protected, with an ester of chlorocarbonic acid, e.g., ethyl chlorocarbonate. Alternatively, the protected amino-substituted carboxylic acid may be converted to a reactive acid halide.

The several methods used to form the aminoacyl derivatives of 6-aminopenicillanic acid (in which the amino group of the amino acid is protected) are standard procedures employed in peptide synthesis and include the use of a reactive acid azide or a carbodi-imide reagent cf. Sheehan and Hess, J. Amer. Chem. Soc., 1955, 77, 1067. The subsequent removal of the protecting group to form the free amino-substituted penicillin is effected by catalytic hydrogenation. Suitable protecting groups are of the general formula R″O.CO—, where R″ is an allyl, benzyl (as shown in the formula above), substituted benzyl, phenyl or substituted phenyl group, or the trityl group Ph$_3$.C—. The abbreviation "Ph" as used herein represents the phenyl group. The "carbobenzoxy" group (PhCH$_2$OCO—) is also sometimes referred to herein as the "carbobenzyloxy" group.

The diastereoisomers of the compounds of the present invention can be prepared by first preparing the appropriate amino acid having its amino group protected, e.g., DL-α-(carbobenzoxyamino)phenylacetic acid( the optically inactive racemic mixture of the optically active forms), and then separating the optically active forms of such acid, e.g., by way of their salts with optically active bases such as quinine, brucine, etc. and employing the appropriate form in the acylation of 6-aminopenicillanic acid. Thus DL-α-(carbobenzoxyamino)phenylacetic acid may be resolved to obtain D-(—)-α-(carbobenzoxyamino)phenylacetic acid and L-(+)-α-(carbobenzoxyamino)phenlacetic acid, each of which may be reacted with 6-aminopenicillanic acid as illustrated in Examples 7 and 8 to produce D-(—)-α-aminobenzylpenicillin and L-(+) - α - aminobenzylpenicillin, respectively.

The racemic mixtures of the amino acids, i.e., α-aminophenylacetic acid, α-amino-p-chlorophenylacetic acid and α-amino-p-methoxyphenylacetic acid, can be resolved according to methods which are described in detail in the technical literature, particularly in the following references: Betti and Mayer, Ber, 41, 2073 (1908); Ingersoll and Adams, J. Am. Chem. Soc., 47, 1168, (1925); Reihlen and Knopfle, Ann., 523, 199 (1936); Reihlen, Knopfle and Snopper, Ann., 534, 247 (1938); and Kuna, Ovakirinan and Levene, J. Biol. Chem. 137, 334 (1941). The amino group of each of the two isomers of any of the amino acids so separated can then be protected by conversion to its carbobenzoxy derivative, and each such derivative can be used as described herein to acylate 6-aminopenicillanic acid and thus, after hydrogenation, produce the optically pure forms of the penicillins.

D-(—)-α-aminobenzylpenicillin has been found to be more soluble in water at its isoelectric point (about pH 4.7) and to be more active against several kinds of bacteria in vitro than is its isomer, L-(+)-α-aminobenzylpenicillin.

The Minimum Inhibitory Concentration (M.I.C.) in mcg./ml. in vitro against various strains of ten pathogenic Gram-negative organisms was determined by serial dilution in agar for both penicillian G, and α-D-(—)-aminobenzylpenicillin (referred to below as New Cpd.). The results were as follows:

| Organism | M.I.C., mcg./ml. | |
|---|---|---|
| | New Cpd. | Penicillin G |
| E. coli | 6.25 | 25.0 |
| E. coli | 12.5 | 50.0 |
| Proteus vulgaris | 6.25 | 25.0 |
| Proteus vulgaris | 2.5 | 6.25 |
| Salm. typhi | 0.5 | 2.5 |
| Salm. typhi | 0.5 | 2.5 |
| Salm. typhi | 0.6 | 2.5 |
| Salm. typhimurium | 0.5 | 0.6 |
| Salm. paratyphi A | 2.5 | 6.25 |
| Salm. paratyphi B | 2.5 | 5.0 |
| Salm. paratyphi B | 2.5 | 6.25 |
| Salm. paratyphi B | 5.0 | 6.25 |
| Shigella shigae | 1.25 | 5.0 |
| Shigella schmitzi | 2.5 | 6.25 |
| Shigella sonnei | 6.25 | 50.0 |
| Klebsiella pneumoniae | 2.5 | 5.0 |

An elegant procedure for preparing a protected amino acid derivative of 6-aminopenicillanic acid by way of a mixed anhydride with ethoxy or isobutoxy-carbonic acid comprises mixing 0.01 mole of an acid having its amino group protected (whose acid chloride is set forth above), 0.01 mole isobutyl chloroformate and 0.011 mole tertiary hydrocarbonyl or aliphatic amine such as triethylamine or 2,6-dimethylpyridine (also known as 2,6-lutidine) in an anhydrous, inert, and preferably water-miscible solvent such as p-dioxane (e.g., 20 ml.) and if desired 2 ml. pure, dry acetone for about thirty minutes in the cold, e.g., at about 4° C. To this solution of the mixed anhydride there is then added a chilled solution of 0.01 mole 6-aminopenicillanic acid and 0.01 mole tertiary hydrocarbonyl amine, e.g., triethylamine or 2,6-dimethylpyridine, in, for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g., 5 N H$_2$SO$_4$ to pH 2. The free acid is then extracted into a water-immiscible, neutral organic solvent such as ether and the extract is washed with water quickly in the cold, if desired, and then dried, as with anhydrous Na$_2$SO$_4$ and the carbobenzoxy groups protecting the amino groups are removed by hydrogenation. The product in its free form can then be converted to any desired metal, ammonium or substituted ammonium (i.e., amine) salt by treatment in an appropriate solvent with the appropriate base, e.g., a free amine such as procaine base or a solution of sodium or potassium 2-ethylhexanoate in dry n-butanol. The product can also be converted to any desired acid addition salt (of the amino group) by treatment of the product in an appropriate solvent with the appropriate acid, e.g., hydrochloric acid.

The removal of the protecting group is effected by allowing the protected aminoacyl derivative of 6-aminopenicillanic acid to react with hydrogen in the presence of a catalyst. This hydrogenation is normally carried out at room temperature and at atmospheric pressure, the pH of the reaction mixture being from 5 to 9. The solvent for the hydrogenation reaction is normally water, but other nonreducible solvents such as ethyl alcohol or dioxane or mixtures of these with water may be employed. The preferred hydrogenation catalyst is palladium but other catalysts such as platinum or rhodium may be used. The catalyst is preferably employed on an inert support, e.g., of barium carbonate, carbon, strontium carbonate or diatomaceous earth. Since the carbon atom next to that carrying the carbobenzyloxyamino group to be reduced is of an aromatic nature, the hydrogenation step is normally completed in a single treatment with hydrogen and catalyst.

Another method of preparing an ethereal solution of the acid form of the carbobenzoxy derivative of a compound of the present invention comprises preparing a solution in 20 ml. of water of 0.00463 mole 6-aminopenicillanic acid and 1.56 gm. sodium bicarbonate, adding 0.00476 mole of an acid chloride whose formula is set forth above and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g., two portions of 25 ml.). This ethereal extract is dried, as with anhydrous sodium sulfate, and the drying agent is removed to leave a dry ethereal solution from which the product is easily isolated, preferably in the form of an ether-insoluble salt such as the potassium salt and the protecting groups are then removed from the amino groups by hydrogenation as described above. This procedure is used when the acid chloride reacts with a primary amine more rapidly than it does with water, as determined by simple test. In this procedure the acid chloride may be replaced by an equimolar amount of the corresponding acid bromide or acid anhydride. Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is, of course, advisable when more than one phase is present, e.g., solid and liquid or two liquid phases. In the preparation of optically active isomers, mild conditions should be employed throughout the reaction in order to avoid racemization.

At the conclusion of the foregoing reaction, the products in which the amino groups are protected are isolated, if desired, by the techniques used with benzylpenicillin and phenoxymethylpenicillin. Thus the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

6-aminopenicillanic acid is prepared as set forth below or according to Batchelor et al., (Nature 183, 257–258, January 24, 1959) or Belgian Patent 569,728. It is used in the above reactions as the salt of a metal or a tertiary hydrocarbonyl amine or as an ester of a hydrocarbonyl alcohol. Hydrocarbonyl alcohols and tertiary hydrocarbonyl amines are compounds having the formulae

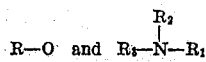

R—O and R₁—N—R₁ with R₂ above wherein the R groups contain only the elements carbon and hydrogen.

PREPARATION OF 6-AMINOPENICILLANIC ACID

The intermediate 6-aminopenicillanic acid is isolated after removal of the natural penicillins from penicillin fermentation broths prepared without the use of added precursors such as phenylacetic acid. For this purpose, suitable penicillin-producing moulds include species of Penicillium, for example, *Penicillium chrysogenum* 5120C, and the members of the notatum-chrysogenum group. The mould is grown preferably under aerobic submerged culture conditions. The culture medium used can be one of the generally accepted media commonly used in the preparation of penicillins. The culture medium usually consists essentially of a carbohydrate nutrient material, for example, glucose or lactose, calcium carbonate, sodium sulphate, and a nitrogenous material capable of providing the nitrogen necessary for the growth of the mould. The nitrogenous material can be either a natural substance, for example peanut meal, or it can be one or more chemical compounds containing nitrogen, for example, ammonium salts such as ammonium lactate or ammonium acetate. Where one or more chemical compounds are used as the nitrogenous material it is usual to incorporate in the culture medium very small amounts of a number of metals such as calcium, iron, zinc, copper, magnesium and manganese and these are normally introduced in the form of an aqueous solution of their salts. A suitable culture medium containing ammonium salts as the nitrogenous material is described by Jarvis and Johnson, J.A.C.S., 69, 3010, (1947), and J. Bact., 59, 51, (1950). Natural nitrogenous materials such as peanut meal usually contain sufficient amounts of suitable inorganic salts and thus when such materials are used in the culture medium it is usually not necessary to make a separate addition of inorganic salts.

The fermentation conditions used in the preparation of the fermentation liquor used in this invention can vary between wide limits, but it has been found preferable to use conditions similar to those commonly used in the preparation of Penicillin G. The temperature employed is preferably one from 20° C. to 35° C. and very satisfactory results have been obtained using a temperature of 25–27° C. The time required for the fermentation depends upon the culture medium and the mould used and the temperature at which the fermentation is carried out. Normal fermentation times are from 48 to 120 hours. The progress of the fermentation can be followed by means of periodic assay.

The fermentation liquor is obtained most satisfactorily when the fermentation is carried out under highly aerobic conditions. In the small scale operations referred to in the examples of this specification, aerobic conditions were achieved by shaking the fermentation mixture on a rotary shaking machine. When working on a larger scale, aerobic conditions can conveniently be obtained either by bubbling air or oxygen through the fermentation mixture, or by rapidly stirring the fermentation mixture. If desired, a combination of stirring and the bubbling of air or oxygen can be used.

It is sometimes preferred to prepare the antibiotic substances by the use of the isolated 6-aminopenicillanic acid or one of the intermediate concentrates obtained during its isolation. A concentrated solution of 6-aminopenicillanic acid can be prepared by evaporating the clarified harvest brew at reduced temperature and pressure to a small volume. If desired, the penicillins present in the brew can be largely removed by extraction with an organic solvent such as butyl acetate at an acid pH. After neutralizing, the liquid substantial amounts of impurities can then be precipitated by the addition of solvents such as acetone, methanol or ethanol. After separating such impurities the clear liquor may then be further concentrated to give a concentrated preparation.

The production by the process of this invention of antibiotic material from fermentation liquor having little or no antibiotic activity is clearly indicated if, before the addition of one of the chemical reagents hereinbefore specified to the fermentation liquor, the penicillins already present as a result of the fermentation reaction by which the fermentation liquor was obtained are removed. This removal can readily be achieved as indicated above by extracting the penicillins from the acidified fermentation liquor by means of an organic solvent, for example, butyl acetate, in which the penicillins are soluble.

Thus 6-aminopenicillanic acid was prepared and isolated as follows:

(a) A strain of *Penicillium chrysogenum* 5120C (obtained from Professor E. B. Chain, Istituto Superiore di Sanita, Rome) was first grown on a glycerol-molasses agar slope for 7 days at 26° C. Sterile distilled water was then added and the spores washed off the surface of the culture to produce a spore suspension. About 10 mls. of this suspension were used to inoculate 5 litres of seed medium in a 10-litre stainless steel stirred fermenter. The seed medium contained 8% w./v. corn steep liquor, 6% w./v. of dextrin and tap water, the pH being adjusted to 6.1 before sterilizing the fermenter and its contents. The tank was stirred at 500 r.p.m. with an air flow of 1 vol./vol./min. and maintained at 27° C. for 48 hours. A volume of 3.2 litres of the contents of this fermenter was then transferred aseptically into a 90-litre stainless steel fermenter containing 50 litres of fermentation medium consisting of peanut meal 3.0% w./v., lactose 4.0% w./v., $Na_2SO_4$ 0.1% w./v., $CaCO_3$ 1.0% w./v. and tap water. The pH was adjusted to 7.2 before the fermenter and its contents were sterilized. After inoculation the tank was maintained at 26–28° C. for 4 days and stirred at 600 r.p.m. by means of an impeller of 12.5 cms. diameter. Air bubbled through the tank at the rate of 1 vol./vol./min. Foaming was controlled by the periodic addition of lard oil containing 2% of octadecanol.

The brew obtained was clarified and 40 litres thereof was concentrated in vacuo to a volume of 4 litres. The pH was then adjusted to 3.0 and the precipitate which formed was removed by centrifuging and the clear liquor was extracted once with half its volume of butyl acetate. The aqueous phase was separated and the pH adjusted to 7.5. Three volumes of acetone was then added with stirring and the precipitate removed by centrifuging. The clear liquor was then concentrated to 2280 mls. and the pH adjusted to 7.0. It had a potency of 54 u./mgm. assayed as described below.

The 6-aminopenicillanic acid was assayed by reacting a sample with phenylacetyl chloride and assaying the penicillin found by the cup plate method described by N. G. Heatley in Biochem. J. 38, 61 (1944) using *B. subtilis* as the bacterium. The purity of the preparation can then be expressed in units per mgm. (u./mgm.) of dry substance.

The potency of pure 6-aminopenicillanic acid assayed by this method is 2750 u./mgm.

(b) 1200 mls. of the concentrate of potency 54 u./mgm. were percolated through 200 gms. of Dowex I resin conditioned with hydrochloric acid. The column was washed with water and this wash was combined with the percolate. The assay of this solution proved it to contain 15% of the 6-aminopenicillanic acid applied. The column was then eluted with 0.05 N hydrochloric acid. The pooled active fractions of the eluate contained 81% of the original 6-aminopenicillanic acid, the solution assaying at 900 u./mgm. The eluate was then adjusted to pH 6.0 and concentrated to 25 mls. in vacuo, concentrated hydrochloric acid was added with stirring to bring the pH to 4.3 and the crystalline 6-aminopenicillanic acid then filtered off and washed with water followed by acetone, and then dried in vacuo. The yield was 1.0 gm. assaying at 2200 u./mgm. (80% pure). Repeated precipitation of the crystalline material from neutral aqueous solution by the addition of hydrochloric acid gave a white crystalline solid of melting point 209–210° C. assaying at 2740 u./mgm. analyzing as follows: (Found: C, 44.6%; H, 5.7%; N, 13.1%; S, 14.1%. $C_8H_{12}O_3N_2S$ requires: C, 44.4%; H, 5.6%; N, 13.0%; S, 14.8%).

The following examples will serve to illustrate this invention without limiting it thereto.

*Example 1*

PREPARATION OF α-CARBOBENZOXYAMINO-BENZYLPENICILLIN

α-Carbobenzyloxyaminophenylacetic acid (0.1 mole), which is obtained by the reaction of equivalent quantities of α-aminophenylacetic acid and benzyl chlorocarbonate in aqueous sodium hydroxide, dissolved in dry acetone is stirred and cooled to approximately −5° C. To this there is added dropwise with continued cooling and stirring a solution of ethyl chlorocarbonate (0.1 mole). After approximately ten minutes, the acylating mixture is cooled to about −5° C. and then is slowly added to a stirred ice-cold mixture of 6-aminopenicillanic acid (0.1 mole), 3% sodium bicarbonate solution (0.1 mole) and acetone. This reaction mixture is allowed to attain room temperature, stirred for an additional thirty minutes at this temperature and then is extracted with ether. The extracted aqueous solution is covered with butanol and the pH adjusted to 2 by the addition of N HCl. The acidified aqueous phase is extracted with butanol, the pH of the aqueous phase being adjusted to pH 2 each time. The combined butanol solutions which contain the free acid, α-carbobenzyloxyaminobenzylpenicillin, are washed with water, and are then shaken with water to which sufficient 3% sodium bicarbonate has been added to bring the aqueous phase to pH 7. This process of washing and shaking is repeated with fresh water and bicarbonate solution. The combined aqueous solutions are washed with ether and then are evaporated under reduced pressure and low temperature. The product, the sodium salt of α-carbobenzyloxyaminobenzylpenicillin, is obtained as a yellow solid in a yield of 65 percent.

*Example 2*

PREPARATION OF α-AMINOBENZYLPENICILLIN

A suspension of palladium on barium carbonate (3.7 grams of 30%) in water (20 ml.) is shaken in an atmosphere of hydrogen at room temperature. The catalyst is then filtered and washed well with water, care being taken that it does not become dry. A solution of the sodium salt of α-carbobenzyloxyaminobenzylpenicillin (4 grams) in water (20 ml.) is added to the pretreated catalyst and the suspension is shaken in an atmosphere of hydrogen at room temperature and pressure for one hour. The catalyst is then filtered off, washed well with water, and the combined filtrate and washings adjusted to pH 7 with N hydrochloric acid. The resulting solution is evaporated in vacuo at a temperature below 20° C. to give α-aminobenzylpenicillin (2.4 grams, 74% yield), which is assayed at approximately 48% pure by the manometric method. Paper chromatography shows that this material contains only one antibiotic which has a considerably different $R_F$ value from that of the starting material.

The product, α-aminobenzylpenicillin [also known as 6-(α-aminophenylacetamido)penicillanic acid], contains the β-lactam structure as shown by infra-red analysis, inhibits *Staph. aureus* at a concentration of 0.012 mcg./ml., and upon intra-muscular injection in mice, exhibits versus *Staph. aureus* Smith, *Salm. typhimurium* and *Klebs. pneumoniae*, a $CD_{50}$ of 0.05 mg./kg., 35 mg./kg. and 62 mg./kg., respectively. The product is very acid-stable, having a half-life (hours) of 3.0 at pH 2.0 at 34° C.;

under similar conditions the half-life (hours) of benzylpenicillin is less than 0.1.

Example 3

PREPARATION OF α-CARBOBENZYLOXYAMINO-P-CHLOROBENZYLPENICILLIN

α-Carbobenzyloxyamino-p-chlorophenylacetic acid (0.1 mole), which is obtained by the reaction of equivalent quantities of α-amino-p-chlorophenylacetic acid and benzyl chlorocarbonate in aqueous sodium hydroxide, dissolved in dry acetone is stirred and cooled to about −5° C. To this there is added dropwise with continued cooling and stirring a solution of ethyl chlorocarbonate (0.1 mole). After approximately ten minutes, the acylating mixture is cooled to about −5° C. and then is slowly added to a stirred ice-cold mixture of 6-aminopenicillanic acid (0.1 mole), 3% sodium bicarbonate (0.1 mole) and acetone. This reaction mixture is allowed to attain room temperature, stirred for an additional thirty minutes at this temperature and then is extracted with ether. The extracted aqueous solution is covered with butanol and the pH adjusted to 2 by the addition of N hydrochloric acid. The acidified aqueous phase is extracted with butanol, the pH of the aqueous phase being adjusted to 2 each time. The combined butanol solutions, which contain the free acid, α-carbobenzyloxyamino-p-chlorobenzylpenicillin, are washed with water to which sufficient 3% sodium bicarbonate to bring the aqueous phase to pH 7 has been added. This process of washing and shaking is repeated with fresh water and bicarbonate solution. The combined aqueous solutions are washed with ether and then are evaporated under reduced pressure and low temperature. The product, the sodium salt of α-carbobenzyloxyamino-p-chlorobenzylpenicillin is obtained as a yellow solid.

Example 4

PREPARATION OF α-AMINO-P-CHLOROBENZYL-PENICILLIN

A suspension of palladium on barium carbonate (3.7 grams of 30%) in water (20 ml.) is shaken in an atmosphere of hydrogen at room temperature. The catalyst is then filtered and washed with water, care being taken that it does not become dry. A solution of the sodium salt of α-carbobenzyloxyamino-p-chlorobenzylpenicillin (4 grams, 42% pure) in water (20 ml.) is added to the pretreated catalyst and the suspension is shaken in an atmosphere of hydrogen at room temperature and pressure for one hour. The catalyst is then filtered off, washed well with water, and the combined filtrate and washings adjusted to pH 7 with N HCl. The resulting solution was evaporated in vacuo at a temperature below 20° C. to give α-amino-p-chlorobenzylpenicillin (88% yield, 45% pure by the manometric method). It was stable in acid solution and was shown to inhibit *Staph. aureus* at a concentration of 0.06 mcg./ml. The product may also be termed 6-(α-amino-p-chlorophenylacetamido)penicillanic acid.

Example 5

PREPARATION OF α-CARBOBENZYLOXYAMINO-P-METHOXYBENZYLPENICILLIN

α-Carbobenzyloxyamino - p - methoxyphenylacetic acid (0.1 mole), which is obtained by the reaction of equivalent quantities of α-amino-p-methoxyphenylacetic acid and benzyl chlorocarbonate in aqueous sodium hydroxide, dissolved in dry acetone is stirred and cooled to about −5° C. To this there is added dropwise with continued cooling and stirring a solution of ethyl chlorocarbonate (0.1 mole). After approximately ten minutes, the acylating mixture is cooled to about −5° C. and then is slowly added to a stirred ice-cold mixture of 6-aminopenicillanic acid (0.1 mole), 3% sodium bicarbonate (0.1 mole) and acetone. This reaction mixture is allowed to attain room temperature, stirred for an additional thirty minutes at this temperature and then is extracted with ether. The extracted aqueous solution is covered with butanol and the pH adjusted to 2 by the addition of N HCl. The acidified aqueous phase is extracted with butanol, the pH of the aqueous phase being adjusted to 2 each time. The combined butanol solutions, which contain the free acid, α-carbobenzyloxyamino-p-methoxybenzylpenicillin, are washed with water to which sufficient 3% sodium bicarbonate to bring the aqueous phase to pH 7 has been added. This process of washing and shaking is repeated with fresh water and bicarbonate solution. The combined aqueous solutions are washed with ether and then are evaporated under reduced pressure and low temperature. The product, the sodium salt of α-carbobenzyloxyamino-p-methoxybenzylpenicillin is obtained as a yellow solid.

Example 6

PREPARATION OF α-AMINO-P-METHOXYBENZYL-PENICILLIN

A suspension of palladium on barium carbonate (3.7 grams of 30%) in water (20 ml.) is shaken in an atmosphere of hydrogen at room temperature. The catalyst is then filtered and washed with water, care being taken that it does not become dry. A solution of the sodium salt of α-carbobenzyloxyamino-p-methoxybenzylpenicillin (4 grams, 59% pure) is added to the pre-treated catalyst and the suspension is shaken in an atmosphere of hydrogen at room temperature and pressure for one hour. The catalyst is then filtered off, washed well with water, and the combined filtrate and washings adjusted to pH 7 with N HCl. The resulting solution was evaporated in vacuo at a temperature below 20° C. to give α-amino-p-methoxybenzylpenicillin (58% yield, 41% pure by the manometric method) which may also be termed 6-(α-amino-p-methoxyphenylacetamido)penicillanic acid. Paper chromatography showed only one antibiotic with a considerably different $R_F$ value from the starting material. It was stable in acid solution and was shown to inhibit *Staph. aureus* at a concentration of 0.025 mcg./ml.

Example 7

PREPARATION OF 6-[D-(−)-α-AMINOPHENYL-ACETAMIDO]-PENICILLANIC ACID

D-(−) - α - (carbobenzyloxyamino)phenylacetic acid, M.P. 130–130.5° C., $[\alpha]_D^{21}$ −119.4° (C=3 in ethanol), is prepared by the action of benzyl chlorocarbonate on an ice-cold solution of D-(−)-α-aminophenylacetic acid in one equivalent of N aqueous sodium hydroxide, further sodium hydroxide being added as the reaction proceeds so as to keep the pH between 8 and 9.

Ethyl chlorocarbonate (4.8 ml.) is added to an ice-cold solution of the above carbobenzyloxy derivative (14.3 g.) and triethylamine (8.3 ml.) in dry acetone (420 ml.). The mixture is stirred at 0° C. for 5 minutes, during which triethylamine hydrochloride precipitates and the mixed anhydride is formed in solution. The suspension is cooled to −50° C. and stirred vigorously while adding as rapidly as possible an ice-cold solution of 6-aminopenicillanic acid (13 g.) in 3% aqueous sodium bicarbonate (420 ml.), the temperature of the mixture never being allowed to rise above 0° C. The resulting clear solution is stirred for 30 minutes at 0° C., then for a further 30 minutes while it attains room temperature, and finally extracted with ether (3×400 ml.), only the aqueous phase being retained. This aqueous solution is brought to pH 2 by the addition of hydrochloric acid and the 6-[D-(−)-α-(carbobenzyloxyamino) - phenylacetamido]penicillanic acid so liberated is extracted into ether (150 ml. in 3 portions). Partial purification of this intermediate is effected by re-extracting it into aqueous sodium bicarbonate as the sodium salt and then, after re-adjusting to pH 2, back into ether as the free acid. Finally, it is re-converted to the sodium salt by shaking the ether solution with sufficient 3% sodium bicarbonate to give a neutral aqueous phase, separating the latter, and evaporating it at low temperature and pressure. The product is finally dried over phosphorus pentoxide in vacuo to give moderately pure sodium 6-[D-(−)-α-(carbobenzyloxyamino) phenylacetamido]penicillanate (13 g.), which gives a single zone of antibiotic activity on a paper chromatogram.

A suspension of palladium on barium carbonate (38 g. of 30%) in water (125 ml.) is shaken in an atmosphere of hydrogen at room temperature and atmospheric pressure for 1 hour. A neutral solution of sodium 6-[D-(−)-α-(carbobenzyloxyamino)phenylacetamido]penicillanate (20.4 g.) in water (250 ml.) is then added and shaking in hydrogen is resumed for a further 1 hour. The suspension is filtered and the combined filtrate and aqueous washings are treated with N-hydrochloric acid to pH 2, then washed with three 100 ml. portions of ether. The aqueous phase is adjusted to pH 4.65 by means of 3% sodium bicarbonate solution and then concentrated at low temperature and pressure to a volume of about 50 ml., whereupon fine colorless needles separate. After 30 minutes the crystals are collected, washed with a little cold water, and dried over phosphorus pentoxide in vacuo to give pure 6-[D-(−)-α-aminophenylacetamido]penicillanic acid monohydrate (5.5 g.), $[\alpha]_D^{21} +281°$ (C=1 in water), decomp. ca 202°. Recrystallization from water does not change the optical rotation. Analysis for $C_{16}H_{19}N_3O_4S \cdot H_2O$: Found: C, 52.5%; H, 5.7%; N, 11.9%; S, 8.9%. Calculated: C, 52.3%; H, 5.8%; N, 11.4%; S, 8.7%.

A further 9 g. of less pure product is obtained by concentrating the aqueous filtrate. Like the first crop, it gives only a single zone of antibiotic activity on a paper chromatogram, which is different from that given by the unreduced carbobenzyloxy intermediate.

Example 8

PREPARATION OF 6-[L-(+)-α-AMINOPHENYL-ACETAMIDO]-PENICILLANIC ACID

L-(+)-α-(carbobenzyloxyamino)phenylacetic acid, M.P. 130–130.5° C., $[\alpha]_D^{21} +117°$ (C=3 in ethanol), is prepared from L-(+)-α-amino-phenylacetic acid by the method described for its enantiomorph in Example 7 above. The product (14.3 g.) is converted into the mixed anhydride with ethyl chlorocarbonate as previously described and coupled with 6-aminopenicillanic acid (13 g.) to give 17.6 g. of moderately pure sodium 6-[L-(+)-α-(carbobenzyloxyamino)phenylacetamido]-penicillanate, which gives a single zone of antibiotic activity on a paper chromatogram.

Hydrogenation of this intermediate is carried out on the same scale and by the same method as that described in Example 7 above. The first crop of crystals (6.2 g.) consists of pure anhydrous 6-[L-(+)-α-aminophenyl-acetamido]penicillanic acid, $[\alpha]_D^{20} +209°$ (C=0.2 in water), decomp. ca, 205° C. Recrystallization from water does not change the optical rotation. (Found: C, 54.9%; H, 5.6%; N, 11.8%; S, 9.2%; $C_{16}H_{19}N_3O_4S$ requires C, 55.0%; H, 5.5%; N, 12.0%; S, 9.2%).

A further 6 g. of less pure product is obtained by concentrating the aqueous filtrate. Like the first crop, it gives only a single zone of antibiotic activity on a paper chromatogram, which is different from that given by the unreduced carbobenzyloxy intermediate.

Example 9

PREPARATION OF 6-[D-(−)-α-AMINOPHENYLACETAMIDO]-PENICILLANIC ACID (TRIETHYLAMINE PROCEDURE)

A total of 7.25 g. (0.0255 mole) of D-(−)-α-(carbobenzoxyamino)phenylacetic acid (M.P. 128–129° C.; $[\alpha]_D^{25} -116.5$ [C 1, alcohol]) and 4.25 ml. of triethylamine are dissolved in 210 ml. of acetone and stirred at 0° C. for 5 minutes. Two and four tenths milliliters (0.0255 mole) of ethyl chloroformate is added and the mixture is placed immediately in a Dry Ice-acetone bath at −50° C. A solution of 6.5 g. (0.030 mole) of 6-aminopenicillanic acid and 16 g. of sodium bicarbonate in 210 ml. of water is added all at once and the mixture is removed from the Dry Ice-acetone bath and stirred for ½ hour between −10° C. and 0° C. and finally for ½ hour at room temperature. The solution is diluted with 1 liter of ether and the aqueous layer which separates is removed. The pH is lowered with concentrated hydrochloric acid to 2 and the penicillin is extracted twice into 300 ml. of ether; the ether is washed with water and finally with 75 ml. of saturated $NaHCO_3$. The aqueous bicarbonate solution is mixed with 8 grams of 5% palladium on strontium carbonate (Engelhard) and hydrogenated at 50 p.s.i. on a Parr low pressure hydrogenator for 1 hour. The catalyst is removed by filtration and the pH of the filtrate is lowered to 2 with concentrated hydrochloric acid and extracted with ether. The pH of the solution is adjusted to 4.65 with solid sodium bicarbonate and evaporated under reduced pressure (water pump) at 32° C. to a volume of 20 ml. A solid crystallizes which is filtered and found to weigh 2.85 g. One gram is recrystallized from 10 ml. of water by lowering the pH to 2 with a few drops of concentrated HCl and raising the pH to 4.65 with solid sodium bicarbonate to yield 0.25 g. of the pure product, 6-[D-(−)-α-aminophenylacetamido]penicillanic acid monohydrate, which is found to melt at 201° C. with decomposition. Anal. Calcd. for $C_{16}H_{19}N_3O_4S \cdot H_2O$: N, 11.4%. Found: N, 11.14%; specific rotation: $[\alpha]_D^{25} +287°$ (C 0.1, water).

Example 10

PREPARATION OF 6-[D-(−)-α-AMINOPHENYLACETAMIDO]-PENICILLANIC ACID (LUTIDINE PROCEDURE)

To 5.5 g. (0.0193 mole) of D-(−)-α-(carbobenzoxyamino)phenylacetic acid and 2.6 g. of (0.0243 mole) 2,6-lutidine in 25 ml. of p-dioxane and 25 ml. of dry acetone at 0° C. is added 1.83 ml. (0.0193 mole) of ethyl chloroformate. A white precipitate forms and the mixture is stirred for 20 minutes. A solution of 4.95 g. of 6-aminopenicillanic acid in 50 ml. of water and 15 ml. of 2,6-lutidine is added all at once. The clear solution is stirred for ½ hour and diluted with 500 ml. of ether. The aqueous layer is separated and solid $NaHCO_3$ is added to keep the pH at 8. The pH of the aqueous is lowered to 2 with concentrated hydrochloric acid and the penicillin is extracted into ether. The ether layer is washed with water and extracted with 25 ml. of saturated sodium bicarbonate solution. The sodium bicarbonate solution containing the penicillin is added to 10 g. of 5% palladium catalyst on diatomaceous earth (Engelhard) made to a paste by the addition of 15 ml. of water. The penicillin is hydrogenated at 50 lbs. p.s.i. pressure on the Parr low pressure hydrogenator for 1 hour at room temperature. Because of the formation of a colloid the mixture is filtered through a Seitz filter. The pH is lowered to 2 by adding concentrated hydrochloric acid and extracted with ether to remove any of the starting penicillin. The aqueous layer is separated and the pH is adjusted to 4.65 by adding solid sodium bicarbonate. By evaporation under reduced pressure (water pump) at 32° C. the volume is reduced to 20 ml. and the crystalline solid product, 6-[D-(−)-α-aminophenylacetamido]penicillanic acid monohydrate, is filtered off. Anal. calcd. for $C_{166}H_{19}N_3O_4S \cdot H_2O$: N, 11.4%. Found: N, 11.34%.

Example 11

PREPARATION OF 6-[L-(+)-α-AMINOPHENYL-ACETAMIDO]-PENICILLANIC ACID

The procedure is the same as that described in Example 10 above using L-(+)-α-(carbobenzoxyamino)-phenylacetic acid $[\alpha]_D^{25} +85.5$ (C=1 in alcohol) in place of D-(−)-α-(carbobenzyloxyamino)phenylacetic acid. Instead of 5% palladium on diatomaceous earth as in Example 10, 5% palladium on strontium carbonate is used. The product, 6-[L-(+)-α-aminophenylacetamido]penicillanic acid monohydrate, has the following specific rotation and elemental analysis: $[\alpha]_D^{25} + 201$ (C=0.197 in water). Anal. Calcd. for $C_{16}H_{19}N_3O_4S \cdot H_2O$:

C, 52.3%; H, 5.7%; N, 11.4%. Found: C, 52.44%; H, 5.69%; H, 11.25%.

Example 12

When in the procedure of Example 1, the α-carbobenzyloxyaminophenylacetic acid is replaced by 0.1 mole of α-carbobenzyloxyamino-4-diethylaminophenylacetic acid,
α-carbobenzyloxyamino - 4 - trifluoromethylphenylacetic acid,
α-carbobenzyloxyamino-2,4-dibromophenylacetic acid,
α-carbobenzyloxyamino-2-nitrophenylacetic acid,
α-carbobenzyloxyamino-3-methylphenylacetic acid,
α-carbobenzyloxyamino-4-sulfamylphenylacetic acid,
α-carbobenzyloxyamino-2-iodophenylacetic acid,
α-carbobenzyloxyamino-4-t-butylphenylacetic acid, and α-carbobenzyloxyamino-2-acetamidophenylacetic acid, respectively, the following corresponding penicillin derivatives are produced:

α-carbobenzyloxyamino-4-diethylaminobenzylpenicillin,
α-carbobenzyloxyamino-4-trifluoromethylbenzylpenicillin,
α-carbobenzyloxyamino-2,4-dibromobenzylpenicillin,
α-carbobenzyloxyamino-2-nitrobenzylpenicillin,
α-carbobenzyloxyamino-3-methylbenzylpenicillin,
α-carbobenzyloxyamino-4-sulfamylbenzylpenicillin,
α-carbobenzyloxyamino-2-iodobenzylpenicillin,
α-carbobenzyloxyamino-4-t-butylbenzylpenicillin, and α-carbobenzyloxyamino-2-acetamidobenzylpenicillin.

Example 13

Replacement of the α-carbobenzyloxyaminobenzylpenicillin in the hydrogenation procedure of Example 7 by the following compounds, α-carbobenzyloxyamino-4-diethyl-aminobenzylpenicillin, α-carbobenzyloxyamino-4-trifluoromethyl-benzylpenicillin, α-carbobenzyloxyamino-2,4-dibromobenzylpenicillin, α - carbobenzyloxyamino-2-nitrobenzylpenicillin, α - carbobenzyloxyamino-3-methylbenzylpenicillin, α - carbobenzyloxyamino - 4 - sulfamylbenzylpenicillin, α - carbobenzyloxyamino-2-iodobenzylpenicillin, α - carbobenzyloxyamino - 4 - t - butylbenzylpenicillin, and α - carbobenzyloxyamino - 2 - acetamidobenzylpenicillin, respectively, results in the formation of the corresponding α-aminobenzylpenicillin, α-amino-4-diethylaminobenzylpenicillin, α - amino - 4 - trifluoromethylbenzylpenicillin, α-amino-2,4-dibromobenzylpenicillin, α-amino-2-nitrobenzylpenicillin, α - amino-3-methylbenzylpenicillin, α - amino-4-sulfamylbenzylpenicillin, α-amino-2-iodobenzylpenicillin, α - amino-4-t-butylbenzylpenicillin, α-amino-2-acetamidobenzylpenicillin, which are isolated as the free acid, and found to inhibit *Staph. aureus* at concentrations of 0.001 percent by weight.

We claim:
1. A member selected from the group consisting of the acids having the formula

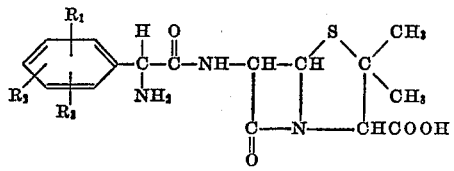

wherein $R_1$, $R_2$ and $R_3$ each represents a member selected from the group consisting of hydrogen, nitro, di(lower)-alkylamino, (lower)alkanoylamino, (lower)alkanoyloxy, (lower)alkyl, (lower)alkoxy, sulphamyl, chloro, iodo, bromo, fluoro and trifluoromethyl and its sodium, potassium, calcium, aluminum and ammonium salts and its nontoxic substituted ammonium salts with an amine selected from the group consisting of tri(lower)alkylamines, procaine, dibenzylamine, N-benzyl-beta-phenethylamine, 1-ephenamine, N,N'-bis-dehydroabietylethylenediamine, N,N'-dibenzylethylenediamine and dehydroabietylamine.

2. α-Aminobenzylpenicillin.
3. α-Amino-p-chlorobenzylpenicillin.
4. α-Amino-p-methoxybenzylpenicillin.
5. D-(—)-α-aminobenzylpenicillin.

No references cited.